United States Patent
Van Blokland

(10) Patent No.: US 11,259,530 B2
(45) Date of Patent: Mar. 1, 2022

(54) DEVICE FOR GUIDING AND SUPPLYING DOUGH TO A DOUGH PROCESSING OR TRANSPORTING MEANS

(71) Applicant: Radie B.V., BC Culemborg (NL)

(72) Inventor: Johannes Josephus Antonius Van Blokland, BG Laren (NL)

(73) Assignee: RADIE B.V.

( * ) Notice: Subject to any disclaimer, the term of this patent is extended or adjusted under 35 U.S.C. 154(b) by 124 days.

(21) Appl. No.: 16/527,728

(22) Filed: Jul. 31, 2019

(65) Prior Publication Data
US 2020/0054026 A1  Feb. 20, 2020

(30) Foreign Application Priority Data

Aug. 2, 2018 (EP) ..................................... 18187056

(51) Int. Cl.
| | | |
|---|---|---|
| *A21C 9/08* | (2006.01) | |
| *A21C 5/00* | (2006.01) | |
| *A21C 3/04* | (2006.01) | |
| *A21C 3/10* | (2006.01) | |

(52) U.S. Cl.
CPC ............ *A21C 9/08* (2013.01); *A21C 5/003* (2013.01); *A21C 3/04* (2013.01); *A21C 3/10* (2013.01); *A21C 9/083* (2013.01)

(58) Field of Classification Search
CPC .. A21C 5/003; A21C 3/10; A21C 3/04; A21C 9/08; A21C 9/083; A21C 9/10
See application file for complete search history.

(56) References Cited

U.S. PATENT DOCUMENTS

| 2,642,013 A * | 6/1953 | Enoch ...................... | A21C 3/10 425/371 |
| 5,204,123 A * | 4/1993 | Hayashi ................... | A21C 3/02 264/40.7 |
| 7,134,865 B2 * | 11/2006 | Barroche-Heinrich ...................... | A21C 3/04 425/238 |

(Continued)

FOREIGN PATENT DOCUMENTS

| DE | 4232699 A1 * | 3/1994 | ............... A21C 3/02 |
| DE | 10316511 B4 * | 10/2005 | ............... A21C 3/02 |

(Continued)

OTHER PUBLICATIONS

Extended European Search Report for European Patent Application No. 18187056.9 dated Oct. 19, 2018.

(Continued)

*Primary Examiner* — Seyed Masoud Malekzadeh
(74) *Attorney, Agent, or Firm* — Katten Muchin Rosenman LLP

(57) ABSTRACT

The invention relates to a device for guiding and supplying dough to a dough processing or transporting means comprising a receiving chamber with at least one belt conveyor comprising a conveyor belt forming at least part of a side wall of the receiving chamber. The receiving chamber is further provided with at least two sealing strips mounted at opposing side ends of the conveyor, wherein the sealing strips create a seal between the conveyor belt and an adjacent stationary wall forming another part of the side wall of the receiving chamber. The invention further relates to a chunker for subdividing dough into smaller parts comprising said device.

13 Claims, 4 Drawing Sheets

(56) References Cited

U.S. PATENT DOCUMENTS

2018/0092367 A1* 4/2018 Schmidt .................. A21C 7/01
2019/0008166 A1* 1/2019 Freed ...................... A21C 9/08

FOREIGN PATENT DOCUMENTS

| EP | 0466519 A1 * | 1/1992 | ............... A21C 5/00 |
| EP | 0 466 519 A1 | 6/1993 | |
| EP | 0 545 725 A1 | 6/1993 | |
| EP | 0545725 A1 * | 6/1993 | ............... A21C 5/00 |
| EP | 3 311 670 A1 | 4/2018 | |

OTHER PUBLICATIONS

Communication under Rule 71(3) EPC dated Nov. 25, 2020, from European Patent Application No. 18187056.9, 44 sheets.
Decision to grant a European patent pursuant to Article 97(1) EPC dated Apr. 1, 2021, from European Patent Application No. 18187056.9, 2 sheets.

* cited by examiner

DEVICE FOR GUIDING AND SUPPLYING DOUGH TO A DOUGH PROCESSING OR TRANSPORTING MEANS

RELATED APPLICATIONS

This application claims priority of European Patent Application No. 18187056, entitled "DEVICE FOR GUIDING AND SUPPLYING DOUGH TO A DOUGH PROCESSING OR TRANSPORTING MEANS," filed on Aug. 2, 2018 in the European Patent Office, and herein incorporated by reference in its entirety.

TECHNICAL FIELD

The invention relates to a device for guiding and supplying dough to a dough processing or transporting means. The invention further relates to a chunker for subdividing dough into smaller parts, comprising such a device.

BACKGROUND

At an early stage of a dough processing line, a large dough mass typically originating from a dough mixer is via funnel poured either directly onto a conveyor for the formation of an endless sheet or layer of dough or led through a chunker for subdividing dough into smaller pieces that are later individually processed further. The use of such a funnel however introduces a number of problems, on the basis of which lies the fact that the dough tend to adhere (stick) to the funnel walls. By adhering to the funnel walls, the dough mass leaves behind residual dough that pollutes the funnel walls, necessitating more regular cleaning of the funnel. Moreover, due to the friction between the funnel walls and the dough mass, the dough frequently gets stuck inside the funnel as it cannot be carried downwards under the influence of gravitational force.

A number of solutions are known that counteract these problems. One of the solutions is to provide the funnel with a lubricant such as flour or oil. Such lubricants must however be applied in moderation since they form a component of the finally baked dough product. Another, even more simple solution is to deposit the dough mass in the center of the funnel such that contact with the funnel walls is minimized. This however asks for further regulation of the supply of dough to the funnel and commonly necessitates over dimensioning of the funnel. In yet another solution, one or more auxiliary means such as conveyors are used to lead the dough through the funnel. However, dough hereby also adheres to these conveyors, which are even harder to clean as the application of conveyors creates exposed interfaces of parts moving relative to each other between which dough gets stuck, leading to a pollution of not only the funnel externals, but also the funnel and conveyor internals. Moreover, conveyors require regular maintenance and tensioning which increases the device downtime.

SUMMARY

It is therefore object of this invention to provide for a device for guiding and supplying dough to a dough processing or transporting means that solves at least some of the above-mentioned problems related to the adherence of dough to the device surfaces.

The invention provides for this purpose a device for guiding and supplying dough to a dough processing or transporting means. The device according to the present invention comprises a receiving chamber, comprising an inlet opening and a discharge opening opposite to the inlet opening, at least one belt conveyor comprising a conveyor belt forming a part of a side wall of the receiving chamber and extending in a direction of conveyance between the inlet opening and the discharge opening, and at least one stationary wall forming another part of the side wall of the receiving chamber and adjoining at least one of two opposing side ends of the at least one belt conveyor, which side ends run parallel to the direction of conveyance, wherein the device further comprises at least two sealing strips, each mounted on an inside of the receiving chamber alongside one of the opposing side ends of the at least one belt conveyor and each extending from the conveyor belt to an adjacent part of one of the at least one stationary wall to create a seal between the conveyor belt and said stationary wall. The receiving chamber is in a common embodiment formed by a funnel or hopper that narrows in a direction from the inlet opening to the discharge opening to let the dough converge towards the discharge opening. The at least one belt conveyor typically covers a part of the internal side wall of the receiving chamber, which internal side wall extends between the inlet opening and a discharge opening. The sealing strips may also be referred to as liners or skirts and typically comprise an elongated piece of material capably of bridging any existing gap or interface between a side end of the conveyor belt and an adjoining stationary wall.

BRIEF DESCRIPTION OF THE DRAWINGS

The present invention will now be elucidated further on the basis of the following non-limitative Figures, in which.

DETAILED DESCRIPTION

Figure 1:
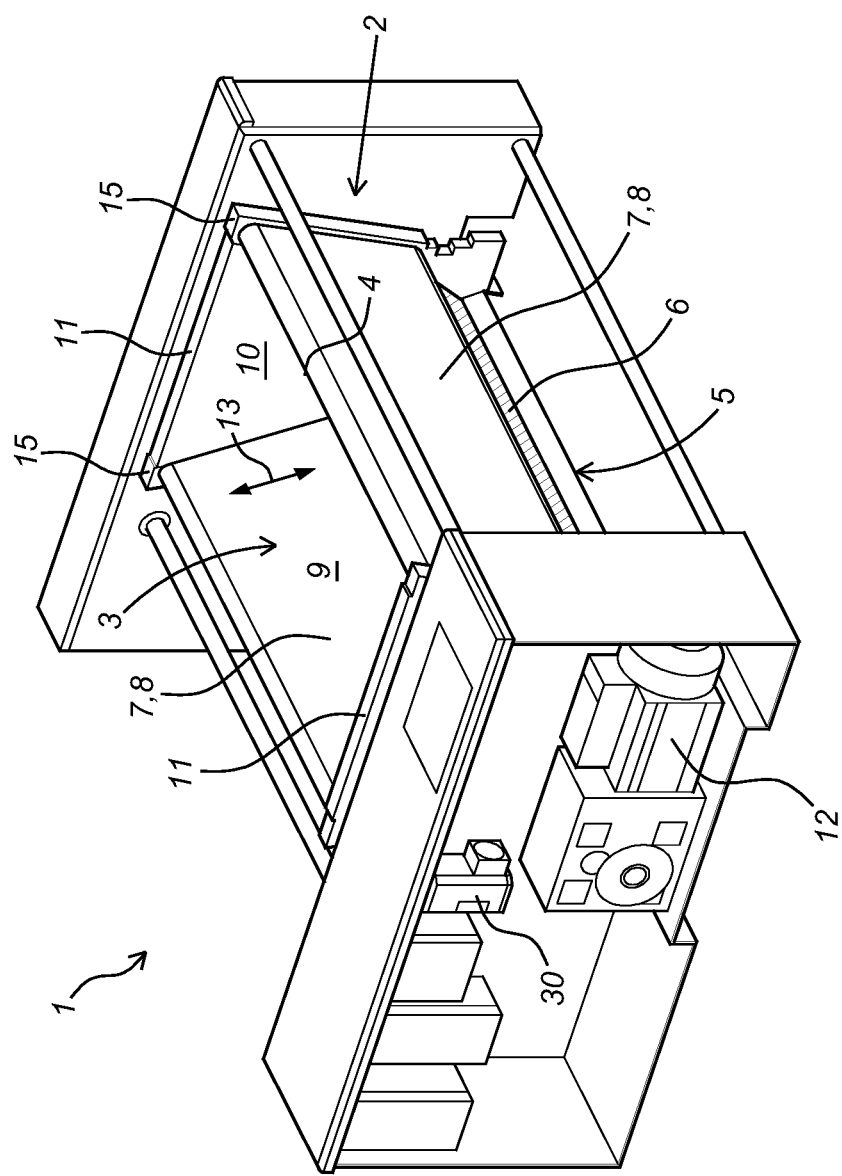
FIG. 1 shows a perspective view on a chunker comprising a device for guiding and supplying dough to a dough processing or transporting means according to the invention.

Due to the application of at least one belt conveyor, the device according to the invention is able actively carry dough though the receiving chamber instead of having to rely on gravity alone. It herewith becomes possible to guide even the stickiest of dough types through the receiving chamber. The sealing strips on the other hand make sure that no dough is able to end up between a side end of the conveyor belt and an adjoining stationary wall where it could further penetrate between the receiving chamber wall parts and conveyor internals. The sealing strips thus ensure that the dough remains contained inside the receiving chamber, considerably reducing consecutive cleaning operations which can be limited to the receiving chamber internal wall.

The at least two sealing strips commonly extend alongside substantially the complete side ends of the conveyor, thereby creating a seal along the entire interface between the conveyor belt and the stationary wall. In case the conveyor belt extends from the inlet opening to the discharge opening, the sealing strips hereby also extend from the inlet opening to the discharge opening.

In a possible embodiment of the device according to the invention, each of the at least two sealing strips encloses an acute angle with the conveyor belt between an outer surface of the conveyor belt and a surface of the sealing strip facing said outer surface of the conveyor belt. Due to said acute angle, the contact surface between the sealing strip and the conveyor belt is increased, increasing the quality of the seal between the sealing strips and the conveyor belt surface. The sealing strips may also be biased towards the conveyor to exert a pre-tension on the conveyor belt. This pre-tension is hereby exerted on the conveyor belt surface in a direction with a component perpendicular to said surface. The acute angle enclosed between the sealing strip and the conveyor belt, and the related increase in contact surface between the sealing strip and conveyor belt hereby aid in the exertion of said pre-tension or biasing force onto the conveyor belt. The biasing of the sealing strips towards the conveyor has multiple advantages, one of which is that the conveyor belt needs to be re-tensioned less frequently or not at all anymore. Moreover, the sealing action of the sealing strips is improved through the exertion of a biasing force, reducing the chance that dough or components thereof still creep past the seal. The at least two sealing strips may advantageously be made of a flexible material conFigured to bend upon pre-tensioning of the conveyor belt, thereby further increasing the contact surface between the sealing strip and conveyor belt. This benefits the seal quality and ensures a more even distribution of the biasing force onto the conveyor belt.

The direction of conveyance of the at least one conveyor belt may be reversible, wherein in a first direction the conveyor belt is conFigured to transport dough towards the discharge opening and in a second, opposite direction the conveyor belt is conFigured to transport dough away from the discharge opening. By allowing the belt conveyor to run in opposing directions, the supply of dough to the discharge opening and therewith any dough processing means positioned at the discharge opening can be controlled further. Specifically, by reversing the direction of conveyance from a direction towards the discharge opening to a direction away from the discharge opening, the supply of dough to the dough processing means at the discharge opening and/or the weight of the dough mass pressing onto the dough processing means at the discharge opening can be reduced, which could benefit the proper functioning of said dough processing means. It is also possible that, in order to decrease the supply to and/or the weight of the dough mass at the discharge opening, the direction of conveyance is not reversed but that the speed of the conveyor belt is temporarily reduced and/or that the conveyor belt is stopped temporarily. It is further possible that the slowing down and/or stopping and/or reversing of the conveyor belt is made dependent on the working cycle of the dough processing means. In case the dough processing means comprise a chunker with blades or knives for portioning the dough mass inside the receiving chamber into smaller portions, the at least one belt conveyor may be conFigured such that its direction of conveyance and/or speed of conveyance is related to position of the blades. Specifically, the belt conveyor may be conFigured such that speed of the conveyor belt is reduced or that the conveyor belt is stopped or even reversed in its direction of conveyance when the blades move away from each other leaving a space between them for the dough mass to pass through before being cut by the blades moving towards each other again. During this time frame, it is especially advantageous if the supply of dough to the discharge opening can be finely controlled such that the dough mass can be cut in even portions.

In another embodiment of the device according to the invention, the at least one conveyor belt may be tensioned between at least two pulleys, which pulleys are rotatably suspended in a frame, wherein the frame is removably mounted in the receiving chamber. In a common instance, the frame is hereto detachably connected to the stationary wall. The removable mounting of the belt conveyor frame inside the receiving chamber allows the entire belt conveyor including the frame to be taken out of the device, which significantly simplifies cleaning of and performing maintenance on the belt conveyor. Moreover, as only the outer surface of the conveyor belt is polluted with dough remains due to the workings of the sealing strips, the conveyor belt can remain suspended inside the frame during cleaning. As such, and contrary to conventional systems wherein only the conveyor belt is taken out for cleaning, no tensioning of the conveyor belt needs to be performed after cleaning. This significantly reduces the effort involved for cleaning of and maintenance on the belt conveyor and therefore reduces the downtime of the device. Any loss in tension over time may be compensated for by allowing the sealing strips to exert a pre-tension on the conveyor belt.

The at least two sealing strips may clamped between the frame and one of the at least one stationary wall. The sealing strips hereby commonly extend beyond the frame and the stationary wall up to the point of contact with the conveyor belt. As a sealing strip is clamped between the frame and the stationary wall, the sealing strips may act as a seal between the frame and the stationary wall in addition to their function as a seal between the conveyor belt and the stationary wall. A build-up of pollution between the frame and the stationary wall is herewith prevented.

In an advantageous embodiment of the device according to the invention, the at least two sealing strips are connected to the frame by which the conveyor belt is suspended. With the removal of the belt conveyor, which includes the removal of the frame, the sealing strips are concurrently removed from the receiving chamber. This facilitates easy cleaning of the sealing strips. In addition, the sealing strips may be removed and replaced more easily outside of the device. This especially applies in case that the sealing strips are biased towards the conveyor to exert a pre-tension on the conveyor belt. Namely, to set the conveyor belt under the right amount of tension the position of the sealing strips relative to the conveyor belt is critical. The positioning of the sealing strips is hereby more easily performed outside of the device. Once set to the right position, the sealing strips are together with the belt conveyor placed back into the device.

The at least two sealing strips may comprise a local thickening which is secured in a recess enclosed by either the frame or one of the at least one stationary wall. The local thickening may take the form of a hump or protrusion, commonly comprising a more narrow neck part. The recess may take a corresponding form, comprising a space with a relatively narrow entry and a wider space lying behind said entry. The local thickening may hereby be slid into the recess from a side. Alternatively, the local thickening may be deformable, wherein the external dimensions of the local thickening exceed the internal dimensions of the recess in an undeformed state of the local thickening. The local thickening may in this case be pushed into the recess upon the exertion of some force deforming the local thickening and/or the recess, leading to a snapping connection. Once positioned in the recess, the local thickening is hereby held clampingly under deformation inside the recess. Upon securing the local thickening in the recess, a strong connection between the sealing strip and the frame or the stationary wall is obtained. In addition, the sealing strip is herewith automatically brought into the right position relative to the frame and/or the stationary wall. When local thickening is held clampingly under deformation inside the recess, movement of the thickening inside the recess and therefore movement of the sealing strip relative to the frame is moreover prevented. To further increase the strength of the connection between the sealing strip and the frame or the stationary wall, the local thickening may extend along substantially the complete length of the sealing strip. The recess may hereby extend over a length corresponding to the length of the sealing strip.

In another possible embodiment of the device according to the invention, the conveyor belt may be positively driven, preventing slipping of the conveyor belt during power transmission. In a specific embodiment, the conveyor belt may hereto on an inner surface be provided with teeth and at least one of the at least two pulleys may on its outer circumference be provided with teeth conFigured to engage on the teeth on the inner surface of the conveyor belt. With the teething provided on the conveyor belt and one or more pulleys, a reliable transfer of power from the pulleys onto the conveyor belt is made possible. Slipping of the conveyor belt is herewith prevented, even under low tension of the conveyor belt.

The at least one belt conveyor may be driven by a drive mounted externally to the belt conveyor and outside of the receiving chamber. This improves the accessibility of the drive and therewith the ease of maintenance of the powertrain. In order to make the power transfer to at least one of the pulleys driving the conveyor belt possible, at least one of the at least two pulleys may comprise a part projecting outside of the conveyor belt, which part is fitted with a sprocket engaging a further sprocket connected to the drive.

The receiving chamber may comprise two opposing belt conveyors forming opposing parts of the inner side wall of the receiving chamber. It is found that the use of two opposing belt conveyors leads to a reliable guidance of the dough mass through the receiving chamber towards the discharge opening and the dough processing or transport means placed behind it. Specifically, the inner side wall of the funnel-shaped receiving chamber may be formed by two opposing belt conveyors placed between two stationary walls. These two stationary walls may be straight to form straight parts of the inner side wall of the receiving chamber, connecting a side end of one of the belt conveyors with a side end of the other belt conveyor.

The invention further relates to a chunker for subdividing dough into smaller parts, comprising a device according to the invention, wherein a number of rotary knives are positioned at the discharge opening of the receiving chamber. The rotary knives hereby form (part of) the dough processing means and function to subdivide the dough mass present in the receiving chamber into smaller pieces. The chunker benefits from being fitted with a device according to the invention, as such a device can guarantee a constant supply of dough to the rotary knives. This constant supply of dough is necessary for the chunker to function well and yield dough pieces of approximately the same size. After being cut, these smaller dough pieces are then commonly transported by dough transporting means to one or more further dough processing stations.

It is especially advantageous if the device according to the invention is incorporated into a device for portioning a dough mass as described in a parallel application with the title "device and method for portioning a dough mass" filed on the same day as the present application by the same applicant, which is hereby incorporated by reference. Namely, both applications relate to an invention that provides a solution for handling an adhesive dough mass within the context of a dough portioning operation using a chunker. Specifically, the release agent delivery system in the before-mentioned parallel application may form a valuable addition to the chunker or the device for guiding and supplying dough to a dough processing or transporting means according to the present invention, as this release agent delivery system is, through applying a release agent onto the rotary knives (also referred to as "blades" or "cutters") and/or the belt conveyors in a targeted manner, able to aid in a smooth and controlled supply of dough to the rotary knives and a clean separation of smaller pieces of dough from the dough mass.

The Figures represent specific exemplary embodiments of the invention and should not be considered limiting the invention in any way or form. Throughout the description and the Figures, corresponding reference numerals are used for corresponding elements.

FIG. 1 shows a perspective view on a chunker 1 comprising a device 2 for guiding and supplying dough to a dough processing or transporting means according to the invention. The device 2 comprises a receiving chamber 3 that in this case is funnel-shaped and narrows in a downward direction. It is however likewise possible that the receiving chamber 3 does not converge in a downward direction, but for example has side walls that run straight down. An inlet opening 4 is present at the top of the receiving chamber 3, through which inlet opening 4 dough is supplied to the receiving chamber 3. At the bottom of the receiving chamber 3 opposite to the inlet opening 4 a discharge opening 5 is provided to which the dough supplied to the receiving chamber 3 is guided. In the case of the chunker 1, the dough processing means to which the dough is guided and supplied by the funnel-shaped receiving chamber 3 are formed by rotary knives 6 that are positioned at the discharge opening 5. Through a rotation of the knives 6, which are driven by a drive 12, a dough mass present in the receiving chamber 3 is cut and therewith divided into smaller pieces. In a common instance, these smaller pieces of dough subsequently fall onto a dough transporting means such as a conveyor (not shown), after which they are transported to the next dough processing station. The receiving chamber 3 is demarcated by two opposing belt conveyors 7, each comprising a conveyor belt 8 with an outer surface 9 that forms part of a side wall 10 of the receiving chamber 3. The belt conveyors 7 are placed between two stationary walls 11 that form another part of the side wall 10 of the receiving chamber 3 thereby further demarcating the receiving chamber 3. A drive 30 mounted externally to the belt conveyors 7 and outside of the receiving chamber 3 is provided to drive the belt conveyors 7 in a direction of conveyance 13 towards or away from the discharge opening 5.

Figure 2:
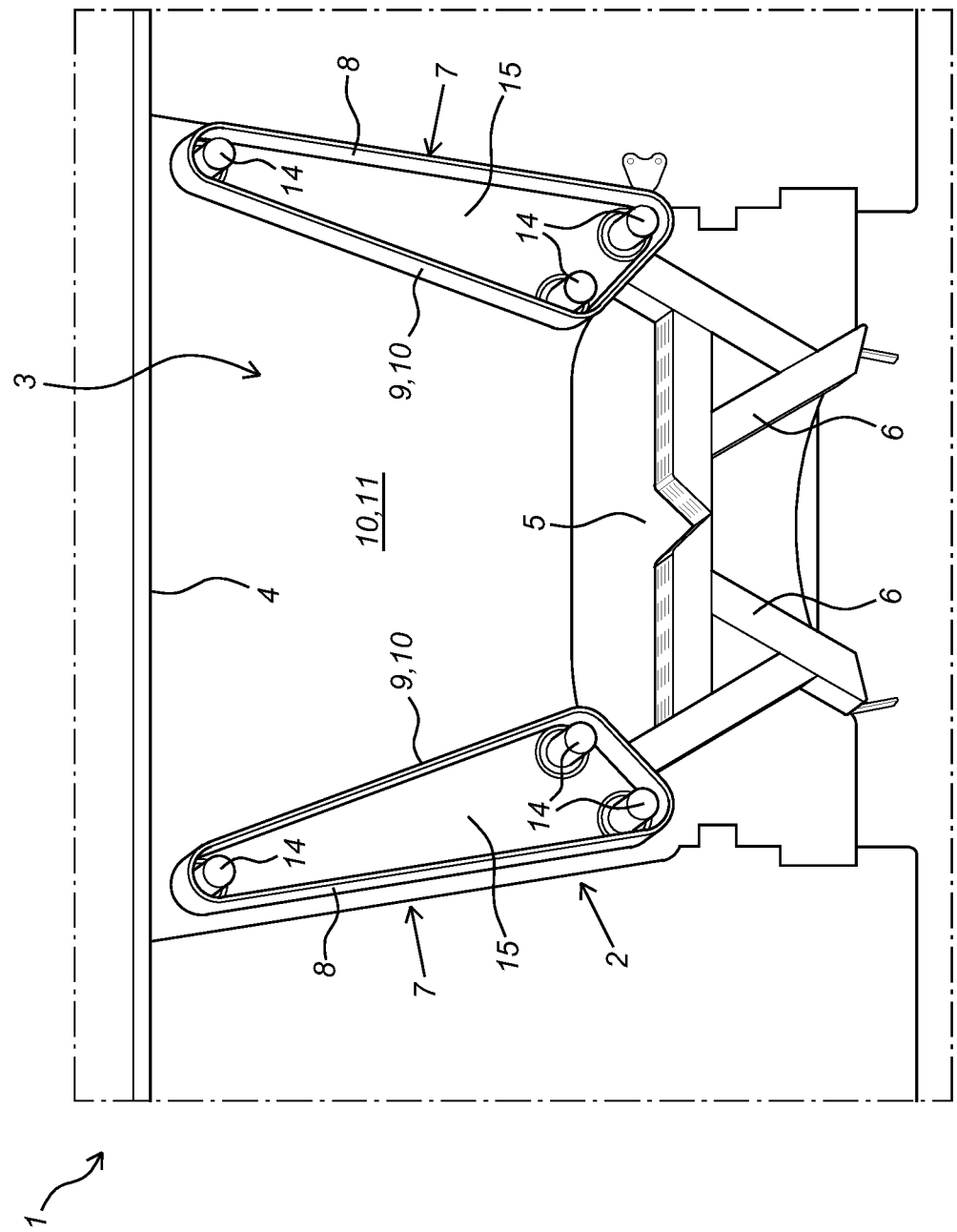
FIG. 2 shows a cross-sectional view on the chunker of FIG. 1.
Figure 3:
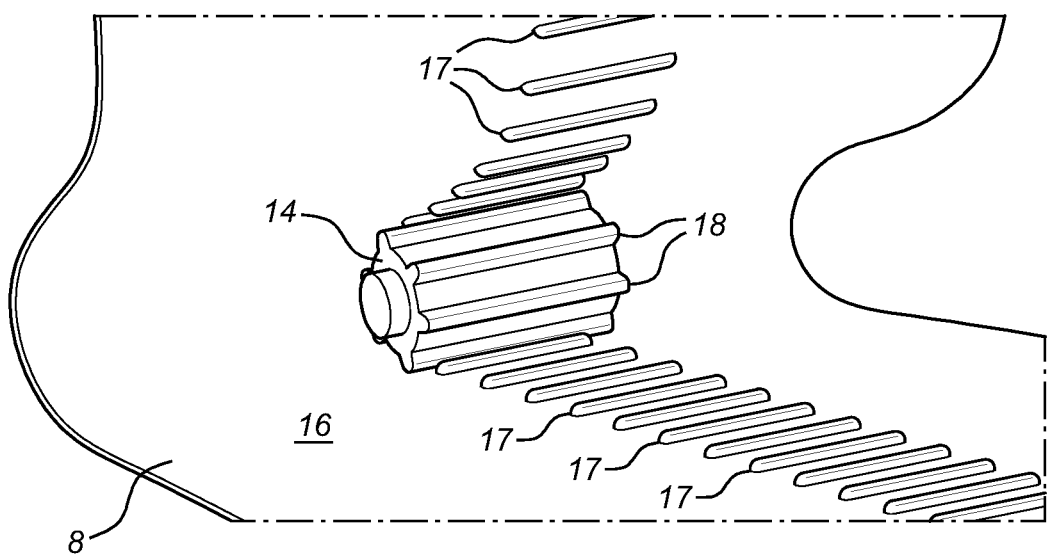
FIG. 3 shows a detailed view on a conveyor belt drive as may be provided in a device for guiding and supplying dough to a dough processing or transporting means according to the invention.

FIG. 2 shows a cross-sectional view on the chunker 1 of FIG. 1, wherein the rotary knives 6 positioned at the discharge opening 5 of the receiving chamber 3 that function as dough processing means are clearly visible. Moreover clearly visible are the opposing belt conveyors 7 that form part of the side wall 10 of the receiving chamber 3. The conveyor belts 8 are tensioned between three pulleys 14, which pulleys 14 are rotatably suspended in a frame 15. A rotation of the conveyor belt 8 is effectuated through a rotation of the pulleys 14, wherein at least one of the pulleys 14 is driven by the external drive 30 shown in FIG. 1. To enable the power transfer between the pulleys 14 and the conveyor belt 8, commonly the conveyor belt 8 is on an inner surface 16 provided with teeth 17 that are engaged by teeth 18 provided on the outer circumference of at least the driven pulleys 14. FIG. 3 shows a detailed view on such a conveyor belt 8 drive as may be provided in a device 2 for guiding and supplying dough to a dough processing or transporting means according to the invention.

Figure 4:
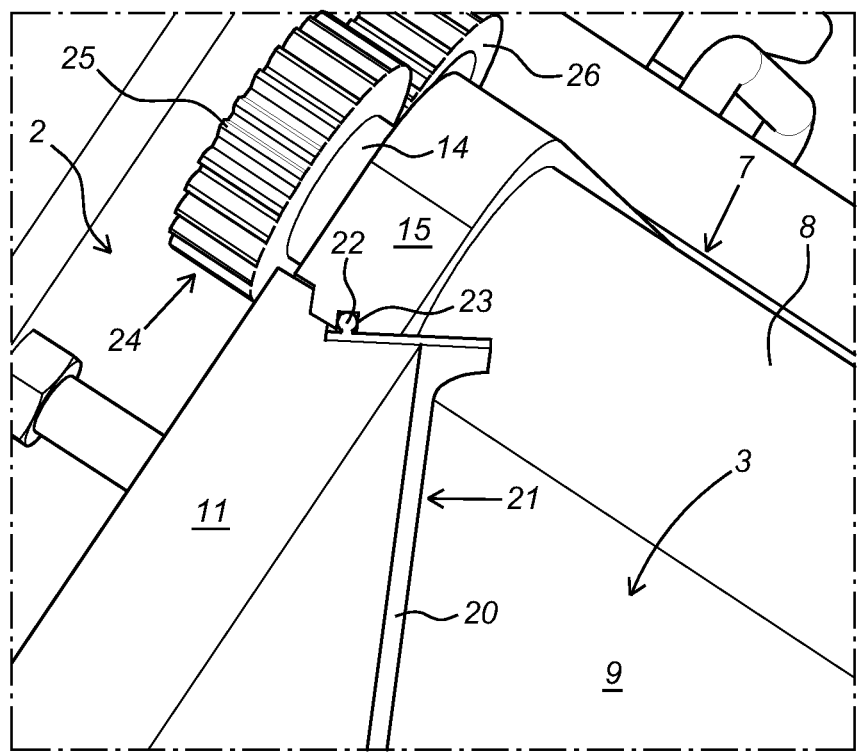
FIG. 4 shows a detailed view on a sealing strip as comprised in device for guiding and supplying dough to a dough processing or transporting means according to the invention.

FIG. 4 shows a detailed view on a sealing strip 20 as comprised in device 2 for guiding and supplying dough to a dough processing or transporting means according to the invention. The sealing strip 20 is mounted alongside one of the opposing side ends 21 of the belt conveyor 7 and extends alongside substantially the complete side end 21. To create a seal between the conveyor belt 8 and the stationary wall 11, the sealing strip 20 extends from the outer surface 9 of the conveyor belt 8 to an adjacent part of the stationary wall 11. In a mounted position of the of the belt conveyor 7, which may be conFigured for complete removal from the chunker 1 for which the frame 15 is removably mounted in the receiving chamber 3, the sealing strip 20 is clamped between the frame 15 and the stationary wall 11. In the embodiment of the chunker 1 as shown in FIG. 4, the sealing strip 20 is furthermore connected to the frame 15. The strip 20 hereto comprises a local thickening 22 which is secured in a recess 23 enclosed by the frame 15. In order to secure the local thickening 22 in the recess 23 and therewith connecting the sealing strip 20 to the frame 15, the local thickening 22 is held clampingly inside the recess 23. This is possible due to the local thickening 22 being deformable, wherein the external dimensions of the local thickening 22 exceed the internal dimensions of the recess 23 in an undeformed state of the local thickening 22 such that the local thickening 22 is deformed when clamped inside the recess 23. Further shown in FIG. 4 is that a pulley 14 over which the conveyor belt 8 runs comprises a part 24 projecting outside of the conveyor belt 8, which part 24 is fitted with a sprocket 25 engaging a further sprocket 26 connected to the drive 30 (shown in FIG. 1).

Figure 5:
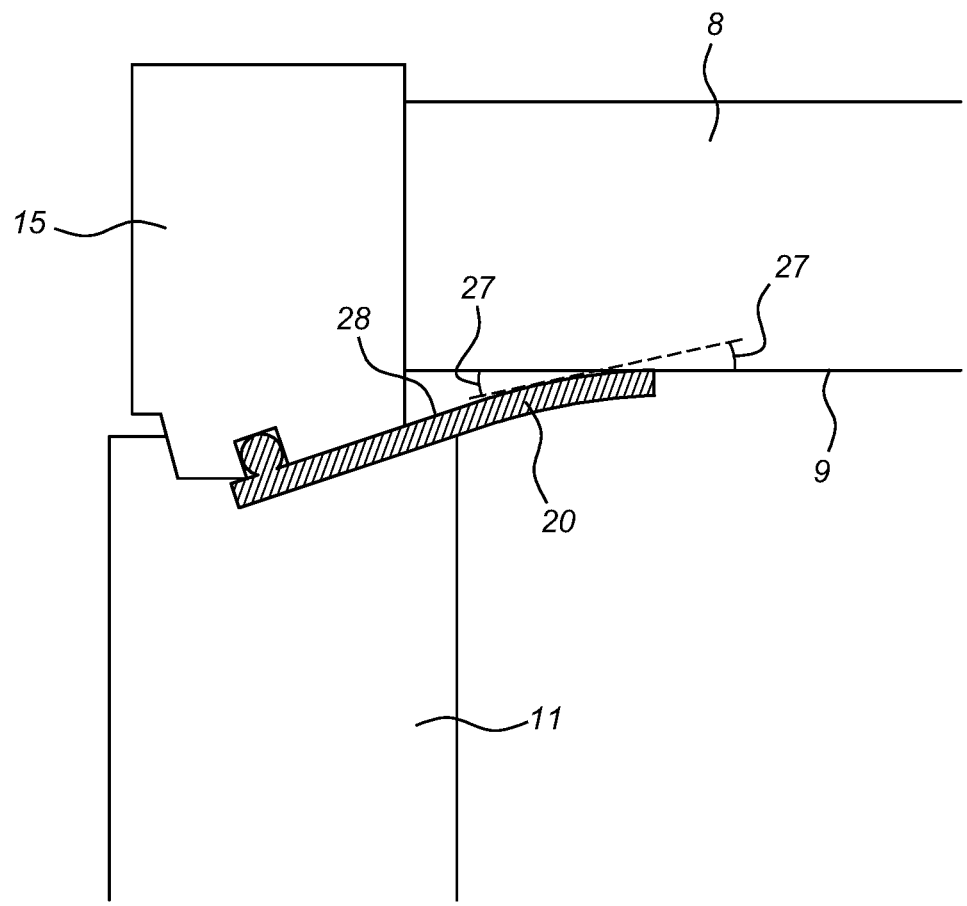
FIG. 5 shows a close-up on sealing strip of FIG. 4 in a sealing position.

Finally, FIG. 5 shows a close-up on the sealing strip 20 of FIG. 4 in a sealing position wherein the sealing strip 20 creates a seal between the conveyor belt 8 and the adjoining stationary wall 11. The sealing strip 20 is hereby clamped between the frame 15 and the stationary wall 11. It may be seen that the sealing strip 20 in this position encloses an acute angle 27 with the outer surface 9 of the conveyor belt 8 between said outer surface 9 of the conveyor belt 8 and a surface 28 of the sealing strip 20 facing the outer surface 9 of the conveyor belt 8. It may moreover be seen that the sealing strip 20 is bend as it is biased towards the conveyor belt 8 to exert a pre-tension on the conveyor belt 8, wherein this bending of the sealing strip 20 is made possible by the flexible material from which the sealing strip 20 is made.

The invention claimed is:

1. A device for guiding and supplying dough to a dough processing or transporting means comprising:
   a receiving chamber, comprising an inlet opening and a discharge opening opposite to the inlet opening,
   at least one belt conveyor comprising a conveyor belt forming a part of a side wall of the receiving chamber and extending in a direction of conveyance between the inlet opening and the discharge opening, and
   at least one stationary wall forming another part of the side wall of the receiving chamber and adjoining at least one of two opposing side ends of the at least one belt conveyor, which side ends run parallel to the direction of conveyance,
   wherein the device further comprises at least two sealing strips, each mounted on an inside of the receiving chamber alongside one of the two opposing side ends of the at least one belt conveyor and each extending from the conveyor belt to an adjacent part of one of the at least one stationary wall to create a seal between the conveyor belt and said stationary wall;
   wherein each of the at least two sealing strips encloses an acute angle with the conveyor belt between an outer surface of the conveyor belt and a surface of each sealing strip facing said outer surface the conveyor belt, the sealing strips are biased towards the belt conveyor to exert a pre-tension on the conveyor belt, and the at least two sealing strips are made of a flexible material configured to bend upon pre-tensioning of the conveyor belt.

2. The device according to claim 1, wherein the direction of conveyance of the at least one conveyor belt is reversible, wherein in a first direction the conveyor belt is configured to transport dough towards the discharge opening and in a second opposite direction the conveyor belt is configured to transport dough away from the discharge opening.

3. The device according to claim 1, wherein the at least one conveyor belt is tensioned between at least two pulleys, which pulleys are rotatably suspended in a frame, wherein the frame is removably mounted in the receiving chamber.

4. The device according to claim 3, wherein the at least two sealing strips are clamped between the frame and the at least one stationary wall.

5. The device according to claim 3, wherein the at least two sealing strips are connected to the frame.

6. The device according to claim 3, wherein the at least two sealing strips comprises a local thickening which is secured in a recess enclosed by either the frame or the at least one stationary wall.

7. The device according to claim 6, wherein the local thickening is deformable, wherein external dimensions of the local thickening exceed internal dimensions of the recess in an undeformed state of the local thickening and wherein the local thickening is held clampingly under deformation inside the recess.

8. The device according to claim 1, wherein the at least one conveyor belt is positively driven.

9. The device according to claim 1, wherein the at least one belt conveyor is driven by a drive mounted externally to the belt conveyor and outside of the receiving chamber.

10. The device according to claim 3, wherein at least one of the at least two pulleys comprises a part projecting outside of the conveyor belt, which part is fitted with a sprocket engaging a further sprocket connected to the drive.

11. The device according to claim 1, wherein the receiving chamber comprises two opposing belt conveyors forming opposing parts of a inner side wall of the receiving chamber.

12. A device for guiding and supplying dough to a dough processing or transporting means comprising:
   a receiving chamber, comprising an inlet opening and a discharge opening opposite to the inlet opening,
   at least one belt conveyor comprising a conveyor belt forming a part of a side wall of the receiving chamber and extending in a direction of conveyance between the inlet opening and the discharge opening, and
   at least one stationary wall forming another part of the side wall of the receiving chamber and adjoining at least one of two opposing side ends of the at least one belt conveyor, which side ends run parallel to the direction of conveyance, wherein the device further comprises at least two sealing strips, each mounted on an inside of the receiving chamber alongside one of the two opposing side ends of the at least one belt conveyor and each extending from the conveyor belt to an adjacent part of one of the at least one stationary wall to create a seal between the conveyor belt and said stationary wall, wherein the at least two sealing strips are configured to be clamped between a frame and at least one stationary wall for acting as a seal between the frame and the stationary wall in addition to a function as a seal between the conveyor belt and the stationary wall to prevent a build-up of pollution between the frame and the stationary wall.

13. The device according to claim 12, wherein the frame is a frame by which the conveyor belt is suspended for allowing concurrently removing the belt conveyor and the sealing strips.

* * * * *

UNITED STATES PATENT AND TRADEMARK OFFICE
CERTIFICATE OF CORRECTION

PATENT NO. : 11,259,530 B2
APPLICATION NO. : 16/527728
DATED : March 1, 2022
INVENTOR(S) : Johannes Josephus Antonius Van Blokland It is certified that error appears in the above-identified patent and that said Letters Patent is hereby corrected as shown below:

In the Claims

Column 8, Line 11: in Claim 1, delete "surface the" and insert --surface of the-- therefor; and Column 8, Line 54: in Claim 12, delete "parts of a inner side wall" and insert --parts of an inner side wall-- therefor.

Signed and Sealed this
Seventeenth Day of October, 2023

*Katherine Kelly Vidal*

Katherine Kelly Vidal
*Director of the United States Patent and Trademark Office*